United States Patent [19]

Jasmer et al.

[11] Patent Number: 4,755,971
[45] Date of Patent: Jul. 5, 1988

[54] BUFFER MEMORY FOR AN INPUT LINE OF A DIGITAL INTERFACE

[75] Inventors: Wolfgang E. Jasmer; Ulrich R. P. Killat, both of Hamburg; Johann E. W. Krüger, Quickborn, all of Fed. Rep. of Germany

[73] Assignee: U.S. Philips Corporation, New York, N.Y.

[21] Appl. No.: 728,729

[22] Filed: Apr. 30, 1985

[30] Foreign Application Priority Data

May 5, 1984 [DE] Fed. Rep. of Germany ....... 3416610

[51] Int. Cl.$^4$ .............................................. G11C 8/00
[52] U.S. Cl. .................................... 365/233; 365/230; 365/189; 370/102
[58] Field of Search ............... 365/233, 236, 239, 189, 365/221, 230; 370/102

[56] References Cited

U.S. PATENT DOCUMENTS

| 4,287,577 | 9/1981 | Deal, Jr. ............................. 365/233 |
| 4,397,017 | 8/1983 | Rokugo ............................. 370/102 |
| 4,423,493 | 12/1983 | Annecke ............................. 365/233 |
| 4,433,394 | 2/1984 | Torii et al. ........................ 365/221 |
| 4,525,849 | 6/1985 | Wolf .................................. 365/221 |

FOREIGN PATENT DOCUMENTS 0026460 4/1981 European Pat. Off. .

Primary Examiner—Stuart N. Hecker
Assistant Examiner—Glenn A. Gossage
Attorney, Agent, or Firm—James J. Cannon

[57] ABSTRACT

A buffer memory for an input line of a digital interface serves to adapt input data which exhibit large phase fluctuations with respect to the local clock of the interface to this local clock. To this end it is necessary to write the input data with the associated clock into the buffer, the data being read with the local clock. Depending on the phase shifts, write and read operation are then liable to occur simultaneously in border cases. In order to enable the use of conventional components in spite of the described phenomenon, the buffer memory is composed of a number of storage blocks which each comprise the same number of addresses, the storage blocks normally being cyclically addressed in succession. An address spacing monitoring device ensures that read and write operations are always performed only in different storage blocks, so that they can take place simultaneously. When the spacing between read and write operations becomes less than the number of address positions of a storage block due to prolonged, large phase fluctuations so that there is a risk of simultaneous read and write operations within the same block, a read address jump is made in order to address a next or a preceding storage block so that the address is increased again. This address jump takes place only at or directly after the changing over of notably the read address from one storage block to another.

5 Claims, 2 Drawing Sheets

BUFFER MEMORY FOR AN INPUT LINE OF A DIGITAL INTERFACE

The invention relates to a buffer memory for an input line of a digital interface in order to compensate for phase fluctuations (drift and jitter) between the data clock of the input data on the input line and the local clock of the interface, comprising a read/write control device which writes the arriving data with the data clock successively into the buffer memory and which reads the data with the local clock in a time-shifted manner, and also comprising a monitoring device which monitors the spacing between the memory location in which a write operation is performed at the relevant instant and the memory location in which a read operation is performed at the same time, said monitoring device increasing said spacing by skipping a number of memory locations when the spacing becomes smaller than a predetermined value during writing and/or reading.

Buffer memories of this kind are required for adapting the input data which arrive from another interface and whose data clock is derived from the input signal itself or from a separate clock line to the local clock of the interface. These two clocks are not synchronized, even when the two interfaces are controlled by the same master clock. The data transmission path between the transmitting and the receiving interface gives rise to phase fluctuations; long-term phase fluctuations which are referred to as "drift" are superposed on the short-term phase fluctuations whose magnitude is usually small and which are referred to as "jitter". Said long-term phase fluctuations can become very large, notably in the case of long transmission paths and high data transmission speeds; they may amount to a multiple of the data clock. When a buffer memory whose capacity is greater than the value corresponding to the phase fluctuations occurring is inserted in the input line of a digital interface in a switching network comprising interfaces which are controlled by a central clock, no data will be lost during the adaptation of the data clock of arriving input data to the local clock of an interface. In non-synchronous switching networks data loss or gaps in the data stream can be avoided by using so-called stuffing methods; the steady phase shift caused by frequency offset is then usually much smaller than the phase fluctuations caused under the influence of the transmission path, so that the capacity of the buffer memory should again at least correspond to the data fluctuations. In any case, simultaneous read and write operations should at least be temporarily possible in such a buffer. This can be achieved by using the so-called elastic memory principle.

A buffer memory of the kind set forth is known from the dissertation "Synchronisationsmöglichkeiten für digitale Breitbandnetze mit Zeitmultiplextechnik" by Helmut Kliem, Technische Universität Braunschweig, 1982. This known buffer memory consists of two parts, that is to say an elastic memory having a very small capacity in which in border cases input data can be written at an address while data can be read at another address at the same time, and a larger memory which is referred to as a frame memory and which receives the data read from the elastic memory; this frame memory writes these data in synchronism with the local clock of the interface and reads the data in an address-shifted manner for supply to the actual interface. Because the data clock can be at least briefly higher than the local clock of the interface due to the phase fluctuations, it must often be possible to write two input data characters into the frame memory within one period of the local clock. Consequently, the operation of the frame memory is such that in each period of the local clock of the interface two write operations and one read operation can be performed at different addresses. Therefore, the cycle duration of the frame memory must be less than one third of the period of the local clock of the interface. Consequently, notably in the case of very high data transmission speeds very fast and hence expensive memories will be required; moreover, the division of the complete buffer memory into an elastic memory and a frame memory necessitates the use of an elaborate and complex control system.

It is an object of the invention to provide a buffer memory of the kind set forth whose cycle duration need not be smaller than the full period of the local clock and whose control system is simple.

This object is achieved in accordance with the invention in that the buffer memory comprises a plurality of separately, successively addressable storage blocks and in that the monitoring device monitors the spacing between writing and reading only when at least one of these operations changes over from one storage block to another and initiates, when the spacing becomes smaller than the predetermined value, such an address jump in the addressing of the storage blocks in the read/write control device that the spacing between writing and reading is increased.

The division of the buffer memory into separate storage blocks which may be formed, for example by an integrated circuit or a group of integrated circuits, and the control of the write and read operations in accordance with the invention ensure that either only one write operation or only one read operation can take place in a storage block, so that for each of these operations there is available the full period of the local clock of the interface or the full period of the data clock of the input data, said periods deviating only slightly from one another.

The division of a memory into several storage blocks in order to perform write and read operations simultaneously in different storage blocks is known in principle from EP-OS No. 26460. However, this known buffer memory concerns a buffer for a data processing system in which the memories are generally addressed at random and in a non-cyclical manner. Therefore, the known buffer memory does not comprise an address spacing monitoring system.

Moreover, from U.S. Pat. No. 4,433,394 there is known a large FIFO memory which comprises several storage banks in which write and read operations can be performed in an independent manner. Therein, successively applied data are applied each time to the next storage bank. Consequently, no monitoring of the spacing between reading and writing is required; however, reading and writing are performed in synchronism under the control of the same clock signal.

The blocks of the buffer memory in accordance with the invention may have a different construction, for example in the form of shift registers or large CCD arrangements. For writing as well as reading use is made of a separate counter; these counters determine whether the relevant storage block has been completely filled with data or has been completely read and control the change over to another storage block in reaction thereto. Another possibility is the use of random access read/write memories with associated, separate address control circuitry for reading and writing. This requires only simple address control because all storage blocks are addressed in the same manner.

In order to prevent a storage block from being simultaneously addressed for writing as well as reading, the predetermined address spacing may in practice not be smaller than the number of addresses of a storage block. For maximum efficiency in the case of simultaneous addressing of the same storage block for reading as well as writing, the monitoring device preferably initiates the address jump at least during a fraction of a clock period. The fraction of the clock period is preferably chosen to be as small as permitted by the switching speed of the components used. Because the phase of the data clock shifts only little with respect to the local clock within the address sequence of a storage block, overlapping of the write operation and the read operation can occur only to an extent which corresponds to the switching delay of the components used for control, said switching delay being substantially shorter than the cycle duration of the memories used in the storage blocks so that such overlapping cannot affect the correct operation of the memory.

The address jump in the addressing of the storage blocks can in principle be performed for the write addresses as well as for the read addresses, for example, each time a jump in the reverse direction of the addresses which succeed one another with the faster clock. However, it is particularly advantageous when the write/read control unit controls the address jump only for the read addresses. This results in very simple control.

In time division multiplex systems the input data customarily arrive in the form of successive frames, each of which consists of the same number of data bits as well as interspaced synchronization information which determines the frame. In that case it is advantageous when the address jump takes place from input data at a given position in a frame to the input data at the same or the next position in another frame. Thus, an address jump does not disturb the frame structure during reading; otherwise resynchronization of the frame clock control would be required. It is then possible to store several frames of input data in one storage block so that an integer number of frames is skipped during the address jump to the same or to the next address of the next or the preceding storage blocks because the address jump in the addressing of the storage blocks should essentially coincide with the change over from an address within the storage block to the next address. On the other hand, however, the capacity or the number of addresses of the storage blocks may also be chosen so that a frame of input data fills exactly a plurality of storage blocks. The address jump should then be made over a corresponding number of storage blocks. In principle, however, it may also be that successive boundaries of the input data frames are not situated at the same addresses within the storage blocks. In addition to a jump in the addressing of the storage blocks a corresponding address jump in the addresses within the storage blocks will then be necessary.

Embodiments in accordance with the invention will be described in detail hereinafter with reference to the drawing. Therein:

Figure 1:
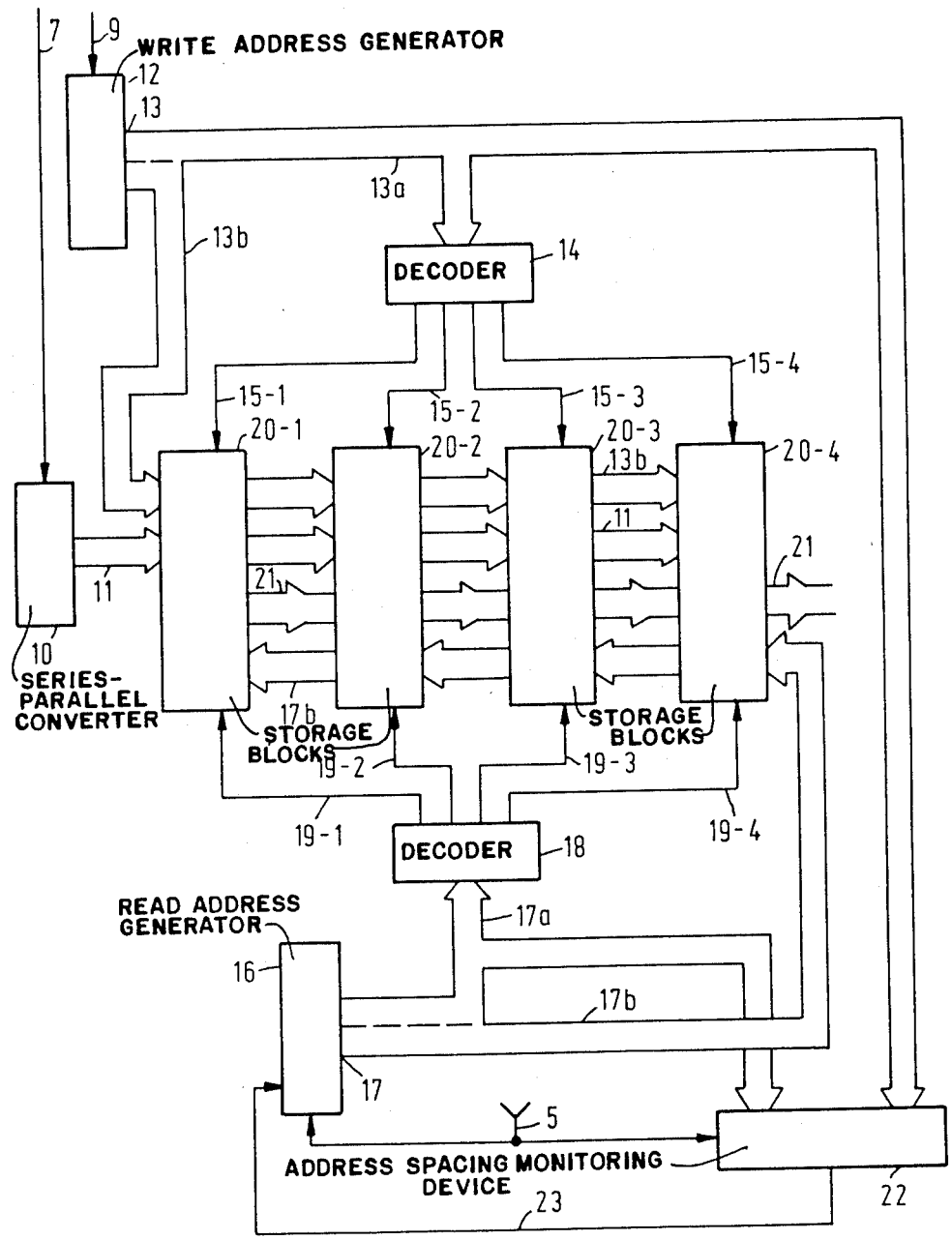
FIG. 1 shows a block diagram of the buffer memory.

In FIG. 1 the input data arrive in serial form and are applied, via a line 7, to a series-parallel converter 10 which outputs the input data each time associated with a data word in parallel via the connection 11. The connection 11 consists of a number of parallel lines; this is denoted by the double line. The other connections which are denoted by double lines in FIG. 1 actually also consist of a number of parallel lines for the parallel transmission of bit groups.

A pulse appears on line 9 whenever the series-parallel converter 10 outputs a complete data word via the connection 11. The formation of this pulse on the line 9 from the data clock which is customarily included in the data signal by appropriate encoding or modulation of the input data is performed in a known manner and is beyond the scope of the present invention.

The pulse on the line 9 are applied to a write address generator 12 which suitably consists of a counter or a chain of counters and which cyclically generates all addresses in succession by way of these pulses. The outputs of the counters are connected to the output 13 of the write address generator 12 on which successive addresses appear in the form of parallel bit groups. The less-significant bit groups are applied, via the connection 13b, to the write address inputs of four storage blocks 20-1 to 20-4, i.e. the addresses of all storage blocks in parallel as denoted by the double line of the connection 13b which is interrupted by the storage blocks. This also holds good for the connection 11 whereto all write data inputs of the storage blocks 20-1 to 20-4 are connected, for the connection 21 which is connected to all read data outputs of the storage blocks, as well as for the connection 17b which is connected parallel to all read address inputs of the storage blocks 20-1 to 20-4. In practice a larger number of storage blocks may be used.

The more-significant address bits are applied, via the connection 13a, to a decoder 14 which generates, for each bit combination on the connection 13a, a corresponding signal on one of its output lines 15-1 to 15-4, each of which is connected to a write control input of a respective storage block 20-1 to 20-4. The storage block whose write control input receives a relevant signal writes the data available on the connection 11 at the address supplied via the connection 13b.

A read address generator 16 which may again comprise a counter or a chain of counters like the write address generator 12, receives a local word clock via the line 5, said word clock being derived from the local clock of a clock generator (not shown) of the interface in which the buffer shown is arranged, and switches over to the next address in response to each pulse of the local word clock in the same way as in the write address generator 12 under the influence of the pulses on the line 9. Parallel bit groups which correspond to successive addresses then appear on the output 17 of the read address generator 16. The less-significant bits of the addresses on the output 17 are applied in parallel, via the connection 17b, to the read address inputs of the storage blocks 20-1 to 20-4 in the described manner. The more-significant bits on the output 17 are applied, via the connection 17a, to a decoder 18 which generates, for each bit combination on the connection 17a, a corresponding signal on one of its outputs 19-1 to 19-4 which are connected to the read control inputs of the corresponding storage blocks 20-1 to 20-4. A storage block which receives a relevant signal via its read control input reads the data at the address supplied via the connection 17b and outputs the data via the output 21.

The description given thus far is based on the assumption that each of the storage blocks 20-1 to 20-4 comprises separate write and read address inputs as well as separate data inputs and data outputs, for example like the integrated ECL storage components 100145. In storage components common address inputs for reading and writing, the address inputs of each storage component must be preceded by a multiplexer, each multiplexer, being controlled, for example, by the corresponding one of the lines 15-1 to 15-4 in order to switch the address input to the write address and to remain otherwise switched to the read address. Consequently, in all other storage blocks the data present at the read address are read, but output only via the connection 21 for the storage block selected via the lines 19-1 to 19-4.

The more-significant write address bits on the connection 13a and the more-significant read address bits on the connection 17a which determine the storage block 20-1 to 20-4 addressed for a write or a read operation, respectively, are also applied to an address spacing monitoring device 22 which also receives the local word clock via the line 5. The device 22 checks whether corresponding bit groups are present on the connections 13a and 17a, i.e. the same storage block (for example, 20-2) is addressed for writing as well as for reading. In which circumstances such a case can occur will be illustrated hereinafter with reference to FIG. 2.

Figure 2:
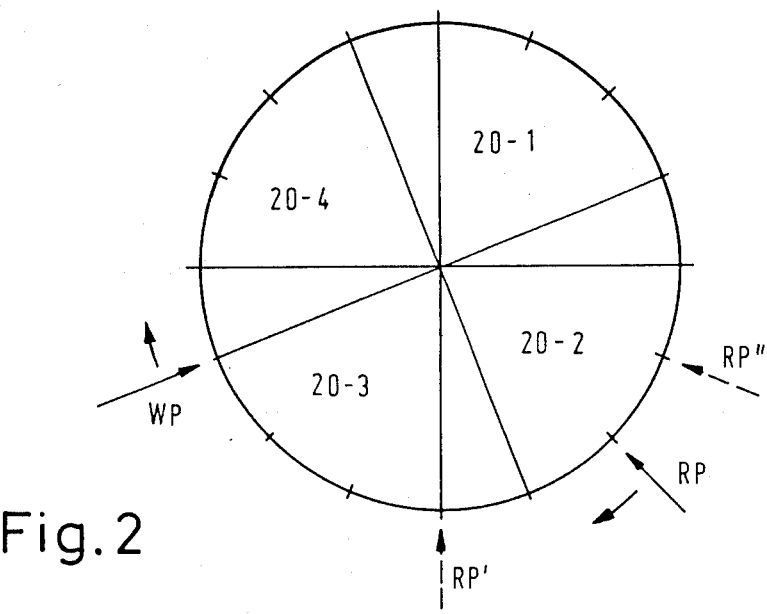
FIG. 2 shows a diagram illustrating the successive addressing of the storage blocks.

In FIG. 2 the successive address positions of the successive storage blocks 20-1 to 20-4 symbolically represented by strokes on a circle in order to indicate that the write addresses as well as the read addresses are normally cyclically passed through in succession. It is assumed that at a given instant the last address (denoted by the arrow WP) of the storage block 20-3 is addressed for a write operation and that the address denoted by the arrow RP in the storage block 20-2 is addressed for a read operation. Both arrows, i.e. the respective addresses controlled for writing and reading, proceed step-wise in the direction indicated, that is to say with a mutual phase shift which is determined by the data clock and the local clock. It will be apparent that the addressing denoted by the non-interrupted arrows in FIG. 2 will not be problematic, because the spacing between write address WP and read address RP is larger than the number of addresses of a storage block, so that writing and reading will take place in different storage blocks.

When it is assumed that due to phase fluctuations between data clock and local clock the latter has a higher instantaneous frequency, the sequence of read addresses will be passed through faster than the sequence of write addresses; after a number of complete addressing cycles over all storage blocks, corresponding to a number of complete revolutions of the arrows RP and WP, the latter arrow will gain on the former arrow to the extent denoted by the arrow RP' (denoted by a broken line). This means that during reading the addressing has just reached the first address of the storage block 20-3, whilst the last address of this block is still being addressed by the write address WP. Because the phase fluctuations between data clock and local clock are comparatively slow, in this case only a very brief overlap will occur between the end of a write operation and the beginning of a read operation in the same storage block 20-3; however, if no further steps were taken, this overlap would become greater each time when the read address changes over to a new storage block until ultimately correct operation of the memory is no longer ensured.

In order to avoid this phenomenon, as soon as the overlap of the write operation and the read operation in the same storage block, i.e. an overlap in time of the same bit combination on both inputs of the device 22, becomes sufficiently long to cause a reaction in view of the limited switching speed of the components used in the device 22, a relevant signal is applied from the device 22 to the read address generator 16 via line 23, with the result that the latter device performs a jump in the more-significant address bits so that subsequently the next address in the storage block 20-2 is addressed in accordance with the arrow RP" (denoted by a broken line). A group of data which has already been read is thus read again, but this is unavoidable when use is made of a buffer memory having an arbitrary construction and a limited capacity. However, it has thus been achieved that the spacing between the write address and the read address is larger again so that write operations and read operations will take place in different storage blocks for at least a prolonged period of time.

In this respect it is assumed that each time an address jump is to be made over one storage block to the next address therein. When the input data is organized in frames as is customary in time division multiplex systems and the input data of a frame (including the synchronization information) occupies several storage blocks, it will be more efficient to perform an address jump over this number of storage blocks.

Figure 3:
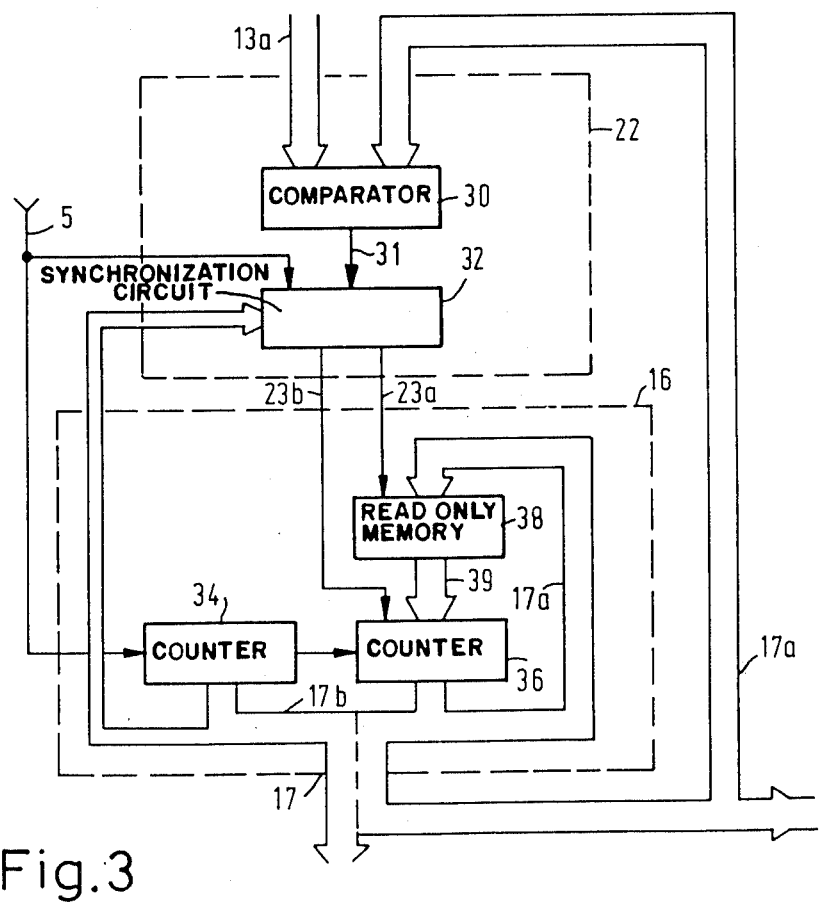
FIG. 3 shows some details of the address spacing monitoring device and the read address generator.

FIG. 3 is a detailed representation of the construction of the read address generator 16 and the address spacing monitoring device 22 in order to illustrate their cooperation during the execution of an address jump in the addressing of the storage blocks. The monitoring device 22 comprises a comparator 30 which receives the more-significant bits of the write address via the connection 13a and the corresponding address bits of the read address via the connection 17a and which applies a relevant signal to a synchronization circuit 32 on the line 31 in the case of correspondence of the two addresses. The comparator also receives the internal word clock via the line 5, representing the read address clock, and synchronizes the signal on the line 31 with this internal clock in order to ensure that the address jump cannot occur between two read clocks during the addressing of the storage blocks but always together with or directly after a read clock. The synchronization circuit 32 also receives a part of the address bits on the connection 17b, notably the most-significant address bit, in order to determine therefrom the direction in which the address jump is to be performed in the read address generator 16. The direction of the address jump is indicated by the signal on the line 23a, the line 23b carrying a corresponding signal during each address jump, regardless of the direction. In the synchronization circuit 32 the direction of the address jump can indeed be determined from the signal of the most-significant address bit of the addresses in the storage blocks on the connection 17b, because if this address bit has the value "1" when the signal appears on the line 31, the read address just addresses the last address in a storage block while the write address jumps to the first address of this storage block, i.e. the write addresses succeed one another with a frequency which is higher than that of the read addresses so that the address generator 16 must subsequently skip a storage block or perform a jump from the first address of the next storage block to the second address of the next storage block but one. Conversely, if the most-significant address bit on the connection 17b has the value "0" when the signal appears on the line 31, the read address addresses the first address of a storage block while the last address thereof is still addressed by the write address, i.e. the sequence of the write addresses or the input clock is higher than the read clock corresponding to the internal clock, and the address generator 16 must address a storage block again in order to increase the address spacing.

The address generator 16 comprises two counters 34 and 36; the counter 34 receives the internal word clock via the line 5 as the counting clock and applies its carry signal to the counting input of the counter 36. The count of the counter 34 which is output via the connection 17b is applied, via the output 17 of the address generator 16, to the read address inputs of the storage blocks 20-1 to 20-4 (see FIG. 1). Similarly, the output signals of the counter 36 which determine the storage block to be addressed for reading are also applied, via the connection 17a and the output 17 of the address generator 16, to the decoder 18 (see FIG. 1) as well as to an input of the device 22; moreover, inside the address generator this connection leads to the address input of a read-only memory 38. This memory comprises another input for a further address bit whereto the line 23a from the device 22 is connected, the signal thereof dividing the address section of the read-only memory 38 into two parts. One part contains the next address for each address supplied via the connection 17a, said next address being read and applied, via the connection 39, to a parallel set input of the counter 36 so that the latter is set to said next address in reaction to a signal on the line 23b, thus performing a forward jump when the storage blocks are addressed. In the other part of the address section determined by the signal on the line 23a the preceding address is stored for each address supplied via the connection 17a, said preceding address also being applied, via the connection 39, to the parallel set input of the counter 36 so that the latter performs a backward jump in reaction to a subsequent signal on the line 23b during the addressing of the storage blocks. The address jumps can thus be simply controlled. Depending on the contents of the read-only memory 38, a jump over more than one storage block can also be performed when a frame of input data covers several complete storage blocks. When the ratio of the number of input data and synchronization information per frame and the number of addresses per storage block or vice versa is not an integer number, an address jump must also be performed within the storage blocks, i.e. a jump of the counter 34; this can be achieved by means of a further read-only memory (not shown) which is addressed by the address section on the connection 17b and possibly on the line 23a and whose data output is connected to parallel set inputs of the counter 34.

What is claimed is:

1. A buffer memory for an input line of a digital interface in order to compensate for phase fluctuations (drift and jitter) between the data clock of the input data on the input line and the local clock of the interface, comprising a read/write control device which writes the arriving data with the data clock successively into the buffer memory and which reads the data with the local clock in a time-shifted manner, and also comprising a monitoring device which monitors the spacing between the memory location in which a write operation is performed at the relevant instant and the memory location in which a read operation is performed at the same time, said monitoring device increasing said spacing by skipping a number of memory locations when the spacing becomes smaller than a predetermined value during writing and/or reading, characterized in that the buffer memory comprises a plurality of separately, successively addressable storage blocks (20) and in that the monitoring device (22) monitors the spacing between writing and reading only when at least one of these operations changes over from one storage block to another and initiates, when the spacing becomes smaller than the predetermined value, such an address jump in the addressing of the storage blocks in the read/write control device (12, 16) that the spacing between writing and reading is increased.

2. A buffer memory as claimed in claim 1, characterized in that the monitoring device (22) initiates the address jump for a fraction of a clock period for writing as well as reading in the case of simultaneous addressing of the same storage block.

3. A buffer memory as claimed in claim 1 or 2 for input data which arrive in the form of successive frames which each consist of the same number of data bits and synchronization information which is inserted therebetween and which determines the frames, characterized in that the address jump takes place from input data in a given location of a frame to the input data in the same or the next location in another frame.

4. A buffer memory as claimed in claim 1 or 2, characterized in that the read/write control device (12, 16) controls the address jump only for the read addresses.

5. A buffer memory as claimed in claim 4 for input data which arrive in the form of successive frames which each consist of the same number of data bits and synchronization information which is inserted therebetween and which determines the frames, characterized in that the address jump takes place from input data in a given location of a frame to the input data in the same or the next location in another frame.

* * * * *